E. B. TAYLOR.
LAWN RAKE.
APPLICATION FILED NOV. 27, 1915.
1,178,427.
Patented Apr. 4, 1916.
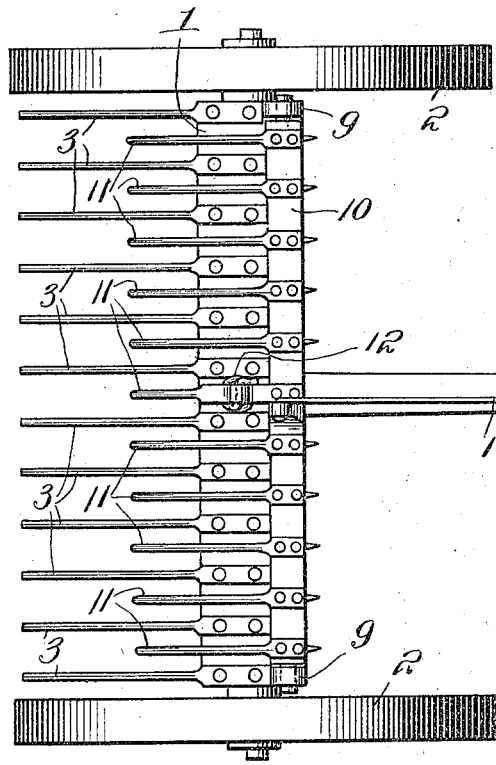
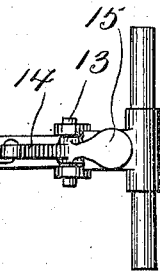
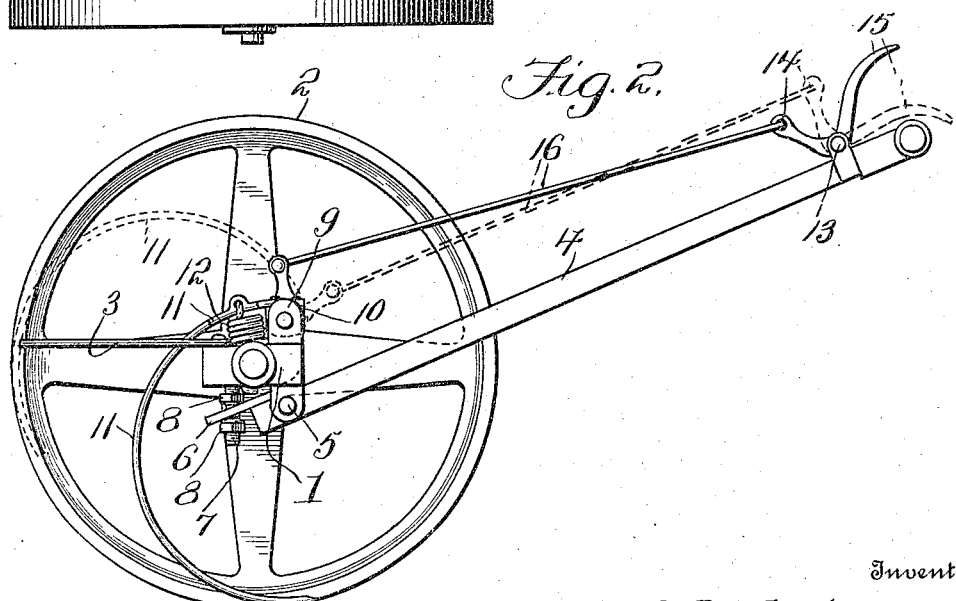
Witness
J. T. L. Wright
Inventor
E. B. Taylor
By Victor J. Evans
Attorney

UNITED STATES PATENT OFFICE.

EVERT B. TAYLOR, OF SHENANDOAH, VIRGINIA.

LAWN-RAKE.

1,178,427.  Specification of Letters Patent.  Patented Apr. 4, 1916.

Application filed November 27, 1915. Serial No. 63,767.

*To all whom it may concern:*

Be it known that I, EVERT B. TAYLOR, a citizen of the United States, residing at Shenandoah, in the county of Page and State of Virginia, have invented new and useful Improvements in Lawn-Rakes, of which the following is a specification.

This invention relates to lawn rakes and it consists in the novel features hereinafter described and claimed.

An object of the invention is to provide a lawn rake of simple structure, the same consisting of a wheel mounted axle having spaced teeth mounted thereon. A bar is pivotally mounted upon the axle and carries a set of teeth which extend through the spaces between the first mentioned teeth and are adapted to be used for gathering the grass upon a lawn. A spring is provided for normally holding the second mentioned teeth in a downward direction. A handle is pivotally and adjustably connected with the said axle and may be disposed at a desired angle with relation to a horizontal. A lever is mounted upon the said handle and means operatively connect the handle with the said bar, whereby the bar may be turned to swing the second mentioned teeth from a lowered to an elevated position between the first mentioned teeth, whereby the grass collected by the second mentioned teeth may be deposited in a pile, and the first mentioned teeth will scrape and remove the grass from between the second mentioned teeth.

In the accompanying drawing:—Figure 1 is a top plan view of the rake. Fig. 2 is a side elevation of the same with parts removed.

The rake comprises an axle 1 having supporting wheels 2 journaled at the ends thereof. Spaced teeth 3 are mounted upon the axle 1, and are disposed rearwardly with relation to the same. The said teeth 3 are straight, and their forward ends are fixedly connected in any suitable manner to the said axle. A handle 4 is pivotally connected at its forward end with the forward edge of the axle 1, as at 5, and the said handle is provided at its forward end with an eye 6, which receives a threaded stud 7, depending from the axle 1. Nuts 8 are screwed upon the stud 7, and lie at the opposite sides of the eye 6, and may be adjusted to swing the handle 4 upon its pivotal connection 5 with the axle 1, whereby the said handle may be pitched at a desired angle with relation to a horizontal, and the rear end of the said handle may be positioned to be conveniently operated or grasped by a person of tall or short statue.

Upstanding lugs 9 are mounted upon the axle 1 in the vicinity of the ends thereof, and a bar 10 is pivoted in the said lugs. Curved teeth 11 are fixed at the upper ends to the bar 10 and the said teeth are rearwardly disposed with relation to the axle and extend down through the spaces between the teeth 3. The lower ends of the teeth 11, when the said teeth are in their lowermost positions, are adapted to have contact with the surface of the ground. A spring 12 is connected at one end with the axle 1 and at its other end with one of the teeth 11 and the said spring is under tension with a tendency to hold the teeth 11 in their lowered position. A shaft 13 is journaled upon the handle 4 and is provided at one end with an upstanding arm 14 and at its other end with an angularly disposed handle 15.

A rod 16 is pivotally connected at one end with the bar 10 and pivotally connected at its other end with the end portion of the arm 14.

When the rake is in operation it is drawn over a lawn and the grass is collected by the teeth 11. When it is desired to dump the grass, the operator uses the handle 15 and turns the shaft 13, whereby the arm is swung about the axis of the shaft and the rod 16 is moved longitudinally. This turns the bar 10 and consequently, the lower ends of the teeth 11 are swung in an upward direction and the spring 12 is stretched. As the teeth 11 move in an upward direction, the grass is dumped and in view of the fact that the teeth 3 are stationary with relation to the teeth 11 the said teeth 3 move along the spaces between the teeth 11 and any grass which may catch or accumulate between the teeth 11 is pushed from the lower ends of the same and falls upon the pile of grass deposited upon the ground. As soon as the handle 15 is released, the tension of the spring 12 comes into play, and the teeth 11 are swung to their lowermost positions and the bar 10 is returned to its normal position.

From the above description taken in conjunction with the accompanying drawing it will be seen that a lawn rake of simple structure is provided and that the same may be easily and quickly manipulated for dumping the grass, and at the same time, the rake is provided with means for automatically cleaning the grass collecting teeth therein.

Having described the invention what is claimed is:—

A rake comprising a wheel mounted axle, a handle pivotally connected therewith, means for adjusting the handle upon the bar to cause the handle to assume a desired angle with relation to a horizontal, straight teeth mounted upon the axle, a bar pivoted upon the axle, curved teeth mounted upon the bar and extending through the spaces between the straight teeth, a spring connected with the axle and one of the curved teeth, and means mounted upon the handle for turning the bar.

In testimony whereof I affix my signature in presence of two witnesses.

EVERT B. TAYLOR.

Witnesses:
R. W. McINTYTE,
J. B. WHITESIDE.

Copies of this patent may be obtained for five cents each, by addressing the "Commissioner of Patents, Washington, D. C."